(12) United States Patent
Ota et al.

(10) Patent No.: US 12,264,010 B2
(45) Date of Patent: Apr. 1, 2025

(54) TRANSPORT SYSTEM, TRANSPORT METHOD, AND NON-TRANSITORY STORAGE MEDIUM

(71) Applicant: TOYOTA JIDOSHA KABUSHIKI KAISHA, Toyota (JP)

(72) Inventors: Junya Ota, Tokyo (JP); Kunihiro Iwamoto, Nagakute (JP); Yuta Itozawa, Nagoya (JP); Hirotaka Komura, Tokyo (JP); Yutaro Takagi, Tokyo (JP); Yoshiaki Nakamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 641 days.

(21) Appl. No.: 17/591,901

(22) Filed: Feb. 3, 2022

(65) Prior Publication Data

US 2022/0267091 A1 Aug. 25, 2022

(30) Foreign Application Priority Data

Feb. 22, 2021 (JP) .................................. 2021-026115

(51) Int. Cl.
*B65G 1/04* (2006.01)
*B66F 9/075* (2006.01)

(52) U.S. Cl.
CPC .......... *B65G 1/0435* (2013.01); *B66F 9/0755* (2013.01); *B65G 2201/0235* (2013.01)

(58) Field of Classification Search
CPC .. B65G 1/0435; B65G 1/0492; B65G 1/0407; B66F 9/06; B66F 9/07; B66F 9/0755; H01L 21/67775
See application file for complete search history.

(56) References Cited

U.S. PATENT DOCUMENTS

| 3,887,097 | A | 6/1975 | Ach et al. |
| 7,467,024 | B2* | 12/2008 | Flitsch ............... H01L 21/67724 |
| | | | 700/114 |
| 10,821,666 | B2* | 11/2020 | Hofmann ........... H01L 21/67775 |
| 2017/0341863 | A1 | 11/2017 | Winkler |

FOREIGN PATENT DOCUMENTS

| DE | 102015101948 A1 | 8/2016 |
| JP | S52080978 U | 6/1977 |
| JP | H11-59815 A | 3/1999 |
| JP | 6413899 B2 | 10/2018 |

* cited by examiner

*Primary Examiner* — Timothy R Waggoner
(74) *Attorney, Agent, or Firm* — Dinsmore & Shohl LLP

(57) ABSTRACT

A transport system includes a transport robot configured to transport an item picked up from a shelving unit or to be stored into the shelving unit, wherein: the transport robot includes a placing table on which the item is to be placed, and a lifting mechanism configured to lift and lower the placing table; and the placing table includes an engaging portion configured to engage with the shelving unit.

4 Claims, 21 Drawing Sheets

TRANSPORT SYSTEM, TRANSPORT METHOD, AND NON-TRANSITORY STORAGE MEDIUM

CROSS-REFERENCE TO RELATED APPLICATION

This application claims priority to Japanese Patent Application No. 2021-026115 filed on Feb. 22, 2021, incorporated herein by reference in its entirety.

BACKGROUND

1. Technical Field

The present disclosure relates to a transport system, a transport method, and a non-transitory storage medium.

2. Description of Related Art

Japanese Patent No. 6413899 discloses a transport system using a transport robot capable of transporting items. The transport robot described in Japanese Patent No. 6413899 can place items on a trolley and transport them.

SUMMARY

When a transport robot picks up an item from a shelving unit or stores an item into the shelving unit, the transport robot may fall due to the moment.

The present disclosure provides a transport system, a transport method, and a non-transitory storage medium that reduce the possibility of a transport robot falling when picking up an item from a shelving unit or storing an item into the shelving unit.

A transport system according to a first aspect of the present disclosure includes a transport robot configured to transport an item picked up from a shelving unit or to be stored into the shelving unit. The transport robot includes a placing table on which the item is to be placed, and a lifting mechanism configured to lift and lower the placing table; and the placing table includes an engaging portion configured to engage with the shelving unit.

A transport method according to a second aspect of the present disclosure is a method for transporting an item picked up from a shelving unit or to be stored into the shelving unit by a transport robot. The transport robot includes a placing table on which the item is to be placed, and a lifting mechanism configured to lift and lower the placing table. The transport method includes engaging the placing table with the shelving unit.

A non-transitory storage medium according to a third aspect of the present disclosure stores instructions that are executable by a processor of a transport robot including a placing table on which an item picked up from a shelving unit or to be stored into the shelving unit is placed and configured to transport the item and that cause the processor to perform functions including causing a lifting mechanism included in the transport robot to lift and lower the placing table such that the placing table engages with the shelving unit.

The present disclosure reduces the possibility of the transport robot falling when picking up an item from the shelving unit or storing an item into the shelving unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
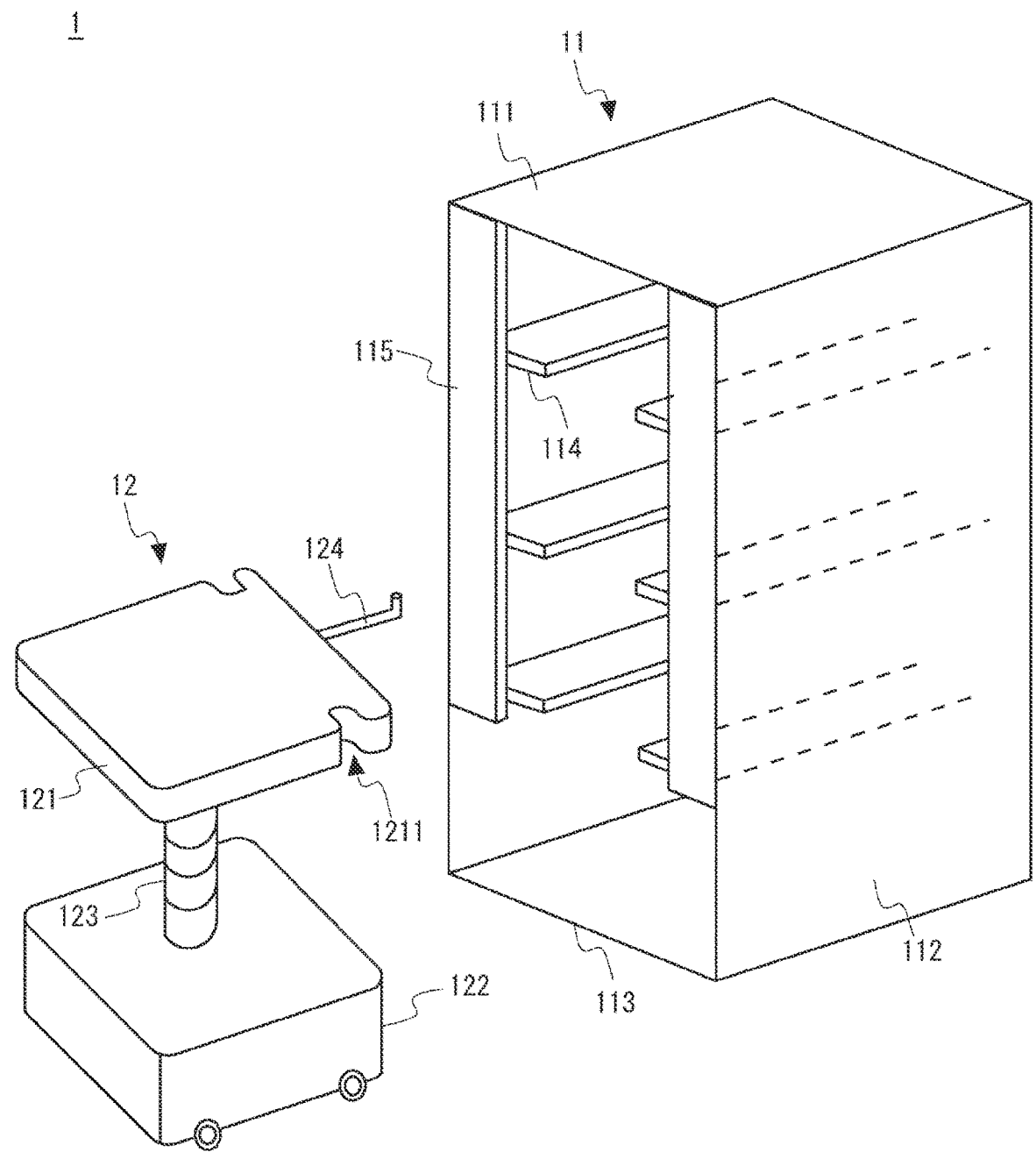
FIG. 1 is a schematic view showing an overview of a transport system according to an embodiment.

Hereinafter, the present disclosure will be described based on an embodiment of the disclosure. However, the disclosure according to the claims is not limited to the following embodiment. Not all of the configurations described in the embodiment are necessary for solving the problem.

Hereinafter, a transport system according to an embodiment will be described with reference to the drawings. FIG.

1 is a schematic view illustrating an overview of a transport system 1 according to an embodiment. The transport system 1 includes a shelving unit 11 and a transport robot 12. The transport system 1 is a system in which the transport robot 12 picks up an item from the shelving unit 11 to transport the item, or transports an item to the shelving unit 11 to store the item into the shelving unit 11.

The shelving unit 11 stores items, not shown. The items may be, for example, returnable containers. The shelving unit 11 includes a top board 111, two side boards 112, a bottom board 113, a plurality of pairs of support members 114, and a plate-shaped member 115. The top board 111, the two side boards 112, and the bottom board 113 form a housing of the shelving unit 11. The pairs of support members 114 support the items stored in the shelving unit 11 (see FIG. 2).

The plate-shaped member 115 engages with an engaging portion 1211 of a placing table 121 that will be described later. The plate-shaped member 115 extends in the vertical direction. The plate-shaped member 115 may be provided parallel to the front side of the shelving unit 11. The plate-shaped member 115 may be provided on both right and left sides of the shelving unit 11 or may be provided on one side of the shelving unit 11. The plate-shaped member 115 protrudes inward from the side board 112. The mechanism of engagement between the shelving unit 11 and the placing table 121 is not limited to the plate-shaped member 115 and a cutout (recess). The plate-shaped member 115 is therefore not an essential constituent component in the present embodiment. For example, the side board 112 may have a recess and the placing table 121 may have a protrusion, and the recess may engage with the protrusion. Modifications will be described at the end of the description of the embodiment.

The transport robot 12 includes the placing table 121, a moving unit 122, a lifting mechanism 123, and an arm 124. The placing table 121 is a table on which an item can be placed, and is also referred to as a top board. The transport robot 12 moves in the horizontal direction by the moving unit 122. The lifting mechanism 123 lifts and lowers the placing table 121. The arm 124 picks up an item from the shelving unit 11 and places it on the placing table 121. The arm 124 also stores an item placed on the placing table 121 into the shelving unit 11. The placement of an item may be performed by the shelving unit 11. The arm 124 is therefore not an essential constituent component in the embodiment. The arm 124 is also referred to as the first arm.

The placing table 121 has the engaging portion 1211. The engaging portion 1211 is a cutout. The engaging portion 1211 engages with the plate-shaped member 115 of the shelving unit 11. In this case, with the placing table 121 being engaged with the shelving unit 11, horizontal movement of the placing table 121 is restricted, but vertical movement of the placing table 121 is not restricted. As described above, the mechanism of engagement between the placing table 121 and the shelving unit 11 is not limited to the cutout and the plate-shaped member 115, and modifications will be described later.

Although the transport system 1 may include a server (not shown) that controls traveling of the transport robot 12, the transport robot 12 itself may generate a transport route and travel autonomously. Accordingly, a system in which processing is completed in the transport robot 12 that does not include the server can also be included in the transport system according to the embodiment.

Figure 2:
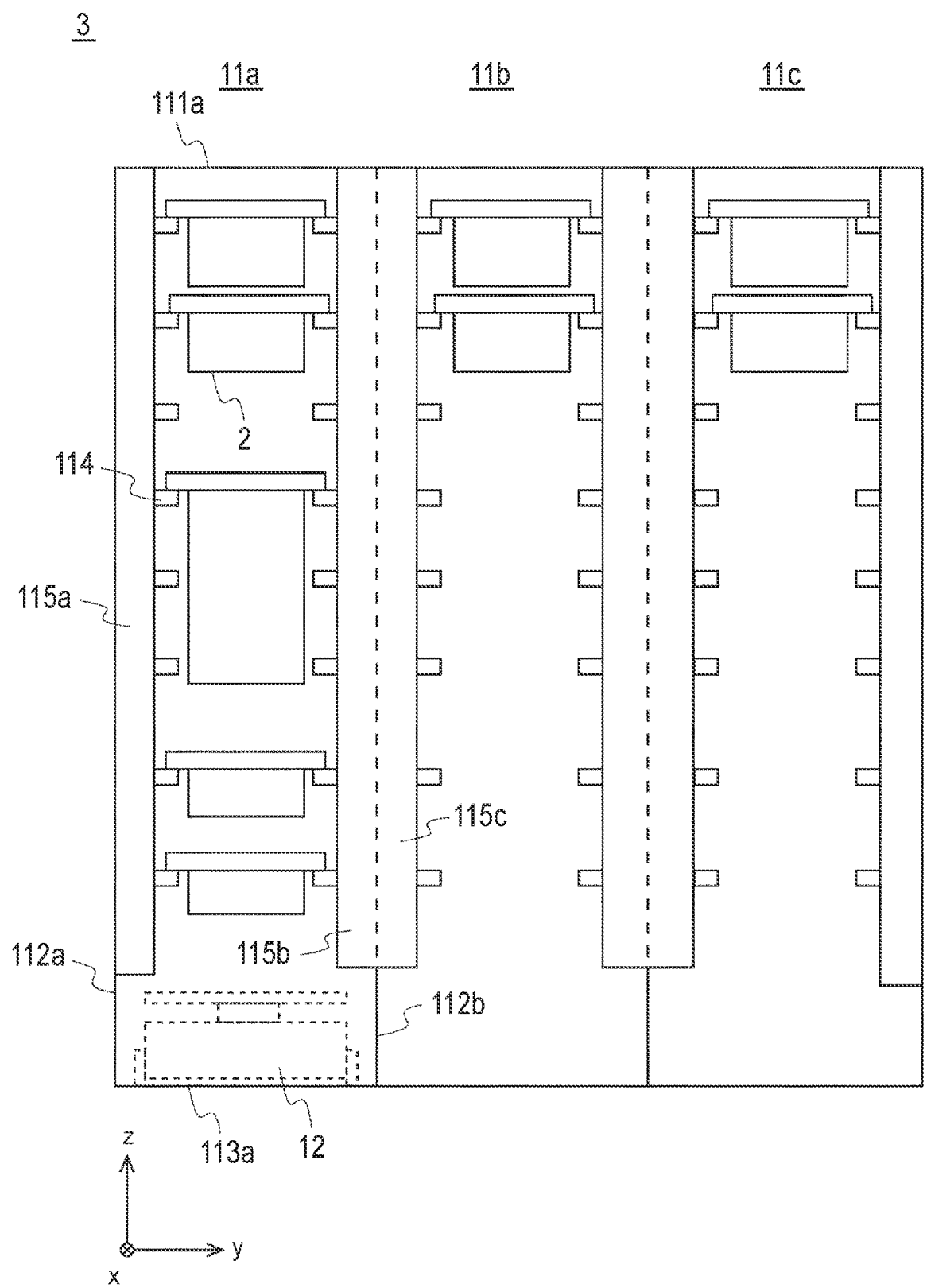
FIG. 2 is a front view showing a configuration of a shelving unit according to the embodiment.

Next, a configuration example of the shelving unit 11 will be described in detail with reference to FIG. 2. The transport robot 12 picks up an item from, for example, a piece of furniture 3 as shown in FIG. 2. The piece of furniture 3 has three storage spaces and can be considered to include a shelving unit 11a, a shelving unit 11b, and a shelving unit 11c. A three-dimensional Cartesian coordinate system of xyz is shown for clarity of explanation. The z direction is the vertical direction.

Since the shelving units 11a, 11b, and 11c have substantially the same configuration, the configuration of the shelving unit 11a will be described. The shelving unit 11a includes a top board 111a, side boards 112a, 112b, a bottom board 113a, a plurality of pairs of support members 114, and plate-shaped members 115a, 115b. The transport robot 12 with the lifting mechanism in a collapsed state is shown by dashed lines.

The top board 111a is parallel to the xy plane. The top board 111a may be included in a top board of the piece of furniture 3. The side boards 112a, 112b are parallel to the xz plane. The side board 112b is also referred to as a partition board of the piece of furniture 3. The bottom board 113a is parallel to the xy plane. The bottom board 113a may be included in a bottom board of the piece of furniture 3. The top board 111a, the side board 112a, the side board 112b, and the bottom board 113a form a housing of the shelving unit 11a. The top board 111a is located on the side in the positive direction of the z-axis. The bottom board 113a is located on the side in the negative direction of the z-axis. The side board 112a is located on the side in the negative direction of the y-axis. The side board 112b is located on the side in the positive direction of the y-axis. The side board 112b serves as both a side board of the shelving unit 11a on the side in the positive direction of the y-axis and a side board of the shelving unit 11b on the side in the negative direction of the y-axis.

The bottom board 113a may be thin enough to allow the transport robot 12 to enter the shelving unit 11a. The shelving unit 11a need not necessarily have the bottom board 113a.

The pairs of support members 114 extend in the depth direction (x-axis direction) and are located at regular intervals in the height direction (z-axis direction) on the inner surfaces of the side boards 112a, 112b. The support members 114 stand substantially perpendicularly from the inner surfaces of the side boards 112a, 112b. Each item 2 has protruding portions protruding outward in the lateral direction of the item 2. The item 2 can be picked up from and stored into the shelving unit 11a by sliding the protruding portions of the item 2 on the pair of support members 114 located adjacent to and facing each other.

The plate-shaped members 115a, 115b are plate-shaped members extending in the vertical direction (z-axis direction) and may be parallel to the yz plane. The plate-shaped members 115a, 115b need only be able to engage with the cutouts of the placing table 121, and need not necessarily be parallel to the yz plane. Hereinafter, the plate-shaped members 115a, 115b are simply referred to as the plate-shaped members 115 when they do not need to be identified. The plate-shaped members 115 may be provided on the front side of the shelving unit 11a. The plate-shaped members 115 may be provided on both the front and back sides of the shelving unit 11a. In this case, the item 2 can be picked up from and stored into the shelving unit 11a from both the front and back sides of the shelving unit 11a. The plate-shaped members 115a, 115b may stand substantially perpendicularly from the inner surfaces of the side boards 112a, 112b, respectively. One plate-shaped member may form both the plate-shaped member 115b of the shelving unit 11a and a plate-shaped member 115c of the shelving unit 11b.

There is clearance between the bottom board 113a or the ground and the lower ends of the plate-shaped members 115a, 115b in order to allow the transport robot 12 to enter the shelving unit 11a. The transport robot 12 with the lifting mechanism in a collapsed state is shown by dashed lines. The width of clearance between the plate-shaped members 115 is greater than the width of the item 2. The plate-shaped members 115 therefore will not interfere with the item 2 when the item 2 is picked up from and stored into the shelving unit 11a.

Figure 3:
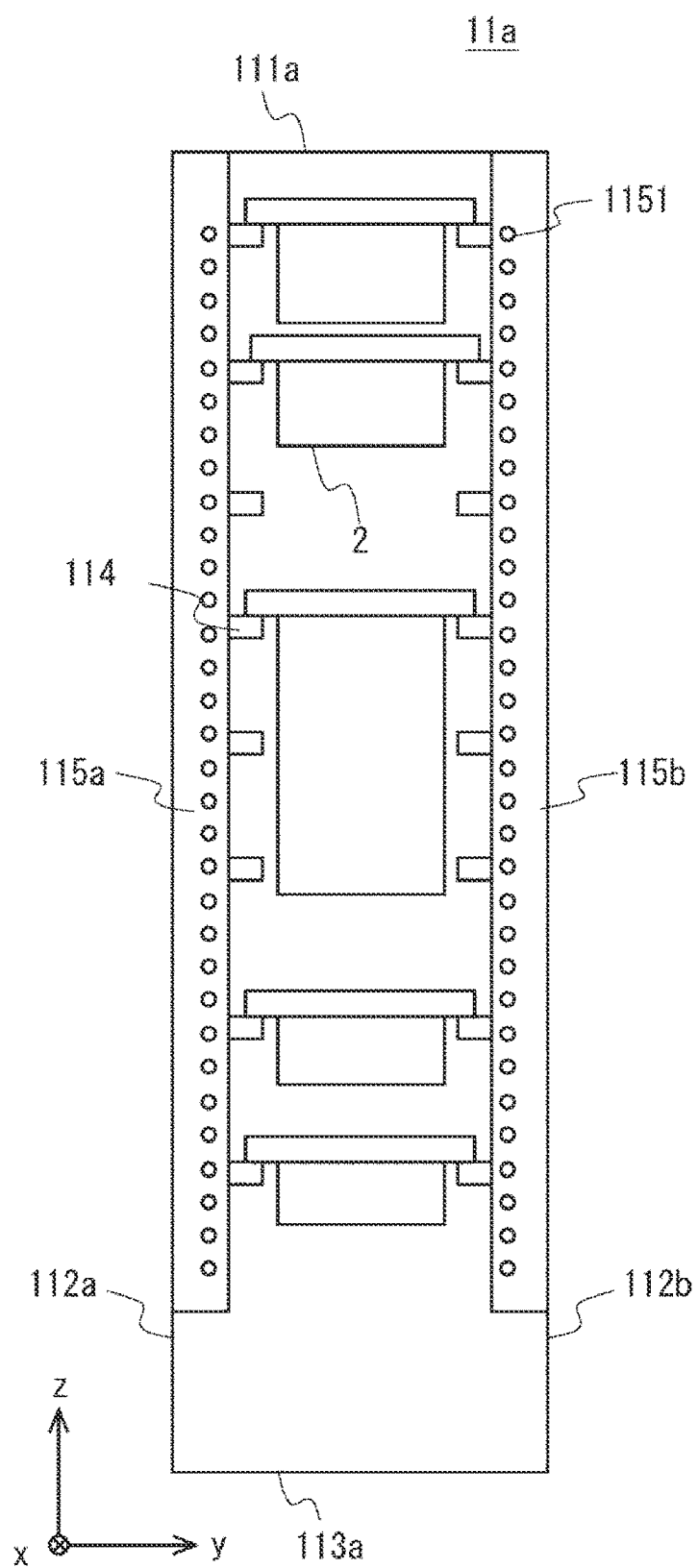
FIG. 3 is a schematic view illustrating holes formed in the shelving unit according to the embodiment.

As shown in FIG. 3, the plate-shaped member 115 may have a plurality of holes 1151 arranged at different heights. In this case, the transport robot 12 can measure the current height of the placing table 121 by using a sensor mounted inward of the cutouts of the placing table 121. The transport robot 12 can measure the height of the placing table 121 by, for example, counting the number of detected holes 1151. The sensor has, for example, a light emitting unit and a light receiving unit that face each other, and can detect a hole when light from the light emitting unit is not blocked by the plate-shaped member 115. The transport robot 12 can thus move the placing table 121 to the height at which the transport robot 12 can pick up the item 2. The height of the placing table 121 may be controlled by a method other than the detection of the holes 1151.

By detecting the holes 1151 with the sensor, the transport robot 12 can also check whether the placing table 121 has been engaged with the plate-shaped member 115. This reduces the possibility of falling of the transport robot 12, and the transport robot 12 can be operated more safely.

Figure 4:
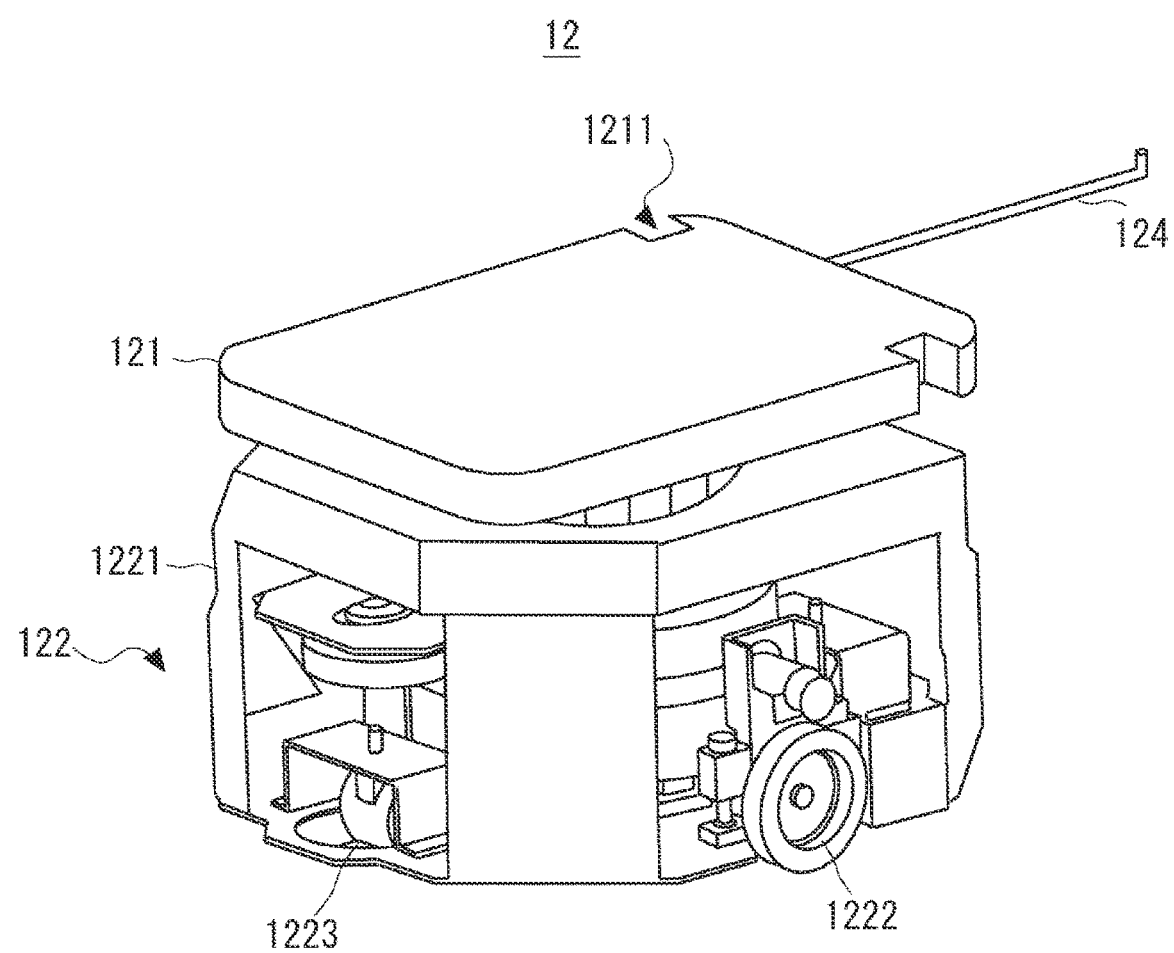
FIG. 4 is a perspective view showing a configuration of a transport robot according to the embodiment.
Figure 5:
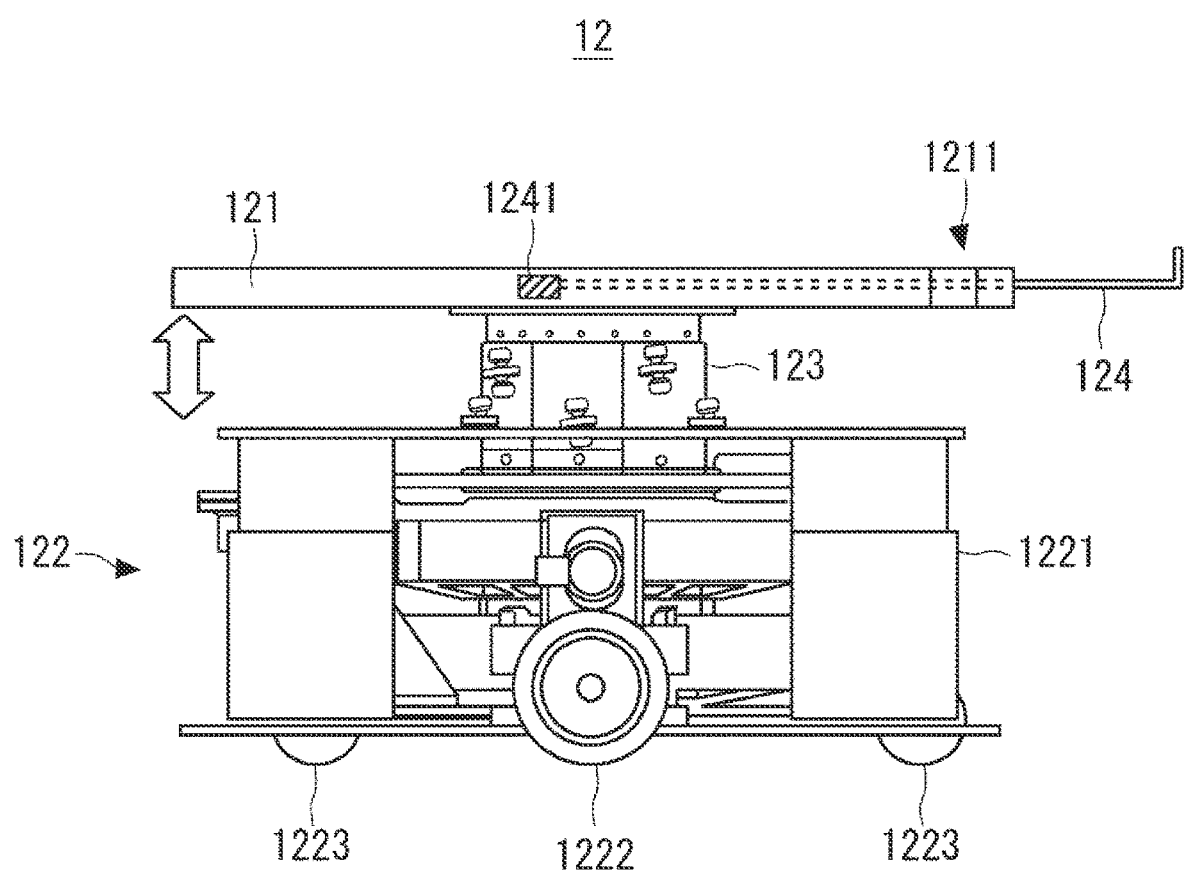
FIG. 5 is a side view showing the configuration of the transport robot according to the embodiment.
Figure 6:
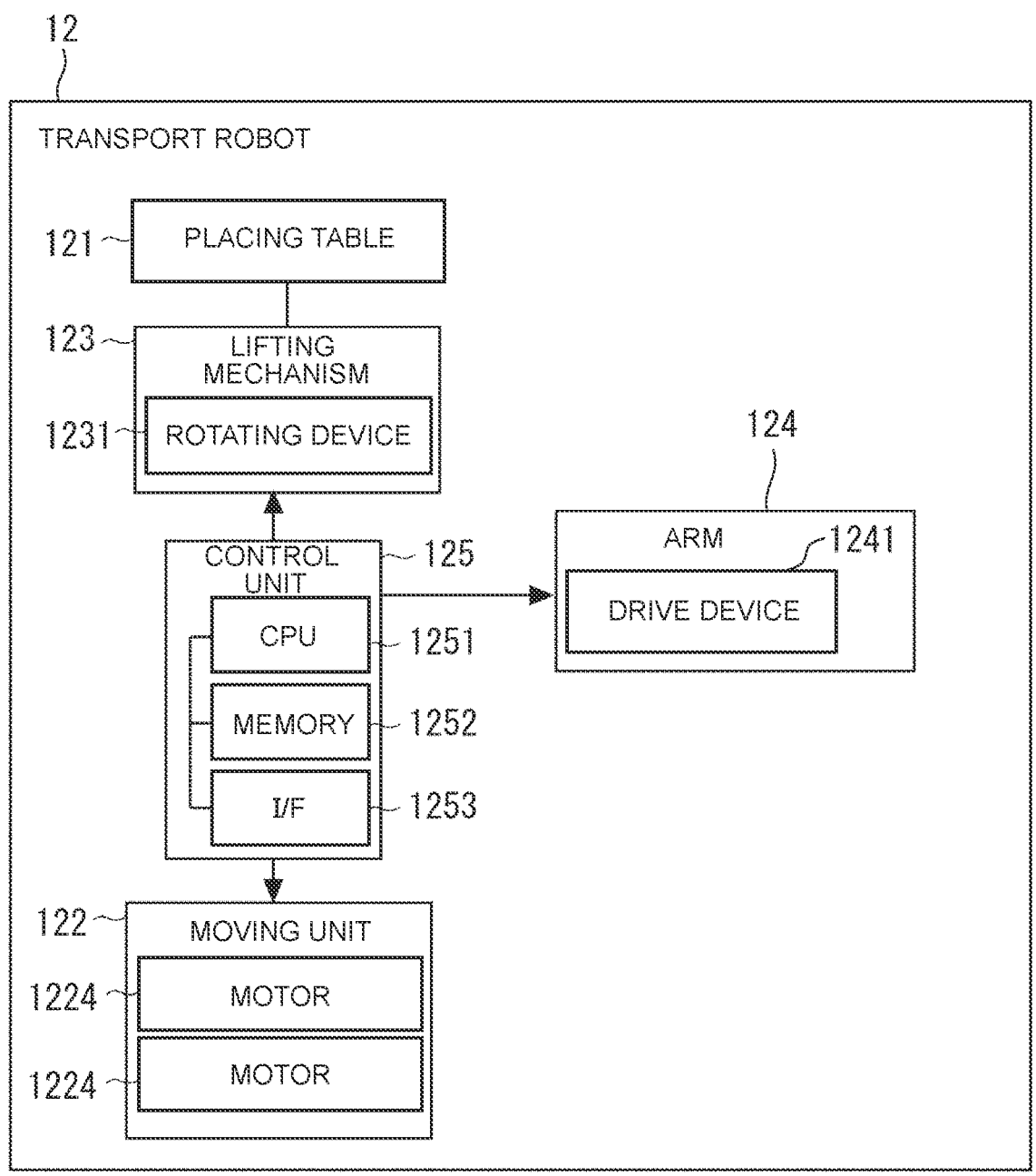
FIG. 6 is a block diagram showing a functional configuration of the transport robot according to the embodiment.

Next, the transport robot 12 will be described with reference to FIGS. 4, 5, and 6. FIG. 4 is a perspective view showing the configuration of the transport robot 12. FIG. 5 is a side view showing the configuration of the transport robot 12. FIG. 6 is a block diagram showing a functional configuration of the transport robot 12.

The transport robot 12 includes the placing table 121, the moving unit 122, the lifting mechanism 123, and the arm 124. The transport robot 12 further includes a control unit 125 that controls the moving unit 122, the lifting mechanism 123, and the arm 124. The placing table 121 has a cutout as the engaging portion 1211. The engaging portion 1211 engages with the plate-shaped member 115 of the shelving unit 11.

A sliding material or a roller may be provided in the engaging portion 1211 (inside the cutout). This allows the placing table 121 to slide smoothly while being engaged with the plate-shaped member 115. As described above, the engaging portion 1211 that is a cutout may be provided with a sensor for detecting the holes in the plate-shaped member 115. Since the engaging portion 1211 need only be a mechanism that engages with the shelving unit 11, the engaging portion 1211 is not limited to the cutout. Examples in which the engaging portion 1211 is other than the cutout (recess) will be described at the end of the description of the embodiment.

The moving unit 122 includes: a moving unit body 1221; a pair of right and left drive wheels 1222 and a pair of front and rear driven wheels 1223 that are rotatably mounted on the moving unit body 1221; and a pair of motors 1224 that drives and rotates the drive wheels 1222. Each motor 1224 rotates a corresponding one of the drive wheels 1222 via a speed reducer etc. The motors 1224 can move the moving unit body 1221 to a desired position by rotating the drive wheels 1222 in response to a control signal from the control unit 125. The configuration of the moving unit 122 is by way of example only, and the moving unit 122 is not limited to this configuration. For example, the moving unit 122 may have any number of drive wheels 1222 and any number of driven wheels 1223, and a known configuration can be applied as long as the moving unit body 1221 can be moved to a desired position.

The lifting mechanism 123 lifts and lowers the placing table 121 in the vertical direction. The lifting mechanism 123 may be configured as a telescopic extendable mechanism that extends and contracts in the vertical direction. The arm 124 is attached to the placing table 121. A drive device 1241 is also attached to the arm 124. Specifically, the drive device 1241 is attached to a guide rail mechanism, not shown, inside the placing table 121, and an arm body can be moved in the horizontal direction. The drive device 1241 may further have a mechanism that rotates the arm body about the axis of the arm body. As described above, the transport robot 12 need not necessarily have a device for storing an item into the shelving unit 11. The device for storing an item into the shelving unit 11 is not limited to the arm 124.

As described above, the control unit 125 controls the moving unit 122, the lifting mechanism 123, and the arm 124. The control unit 125 can control rotation of each drive wheel 1222 and move the moving unit body 1221 to a desired position by sending a control signal to each motor 1224 of the moving unit 122. The control unit 125 can control the height position of the placing table 121 by sending a control signal to a rotating device 1231 of the lifting mechanism 123. The control unit 125 can control the horizontal position of the arm body by sending a control signal to the drive device 1241 for the arm 124.

The control unit 125 may control movement of the moving unit body 1221 by performing well-known control such as feedback control or robust control based on rotation information of the drive wheels 1222 detected by rotation sensors provided for the drive wheels 1222. The control unit 125 may control the moving unit 122, the lifting mechanism 123, and the arm 124 based on information such as distance information detected by a distance sensor such as camera or ultrasonic sensor mounted on the moving unit body 1221 and map information of a moving environment.

The hardware for the control unit 125 is mainly configured by a microcomputer composed of: for example, a central processing unit (CPU) 1251 that performs control processing, arithmetic processing, etc.; a memory 1252 composed of a read-only memory (ROM) storing a control program, an arithmetic program, etc. that are executed by the CPU 1251; and an interface unit (I/F) 1253 that receives and outputs signals from and to the outside. The CPU 1251, the memory 1252, and the interface unit 1253 are connected to each other via a data bus etc.

Figure 7:
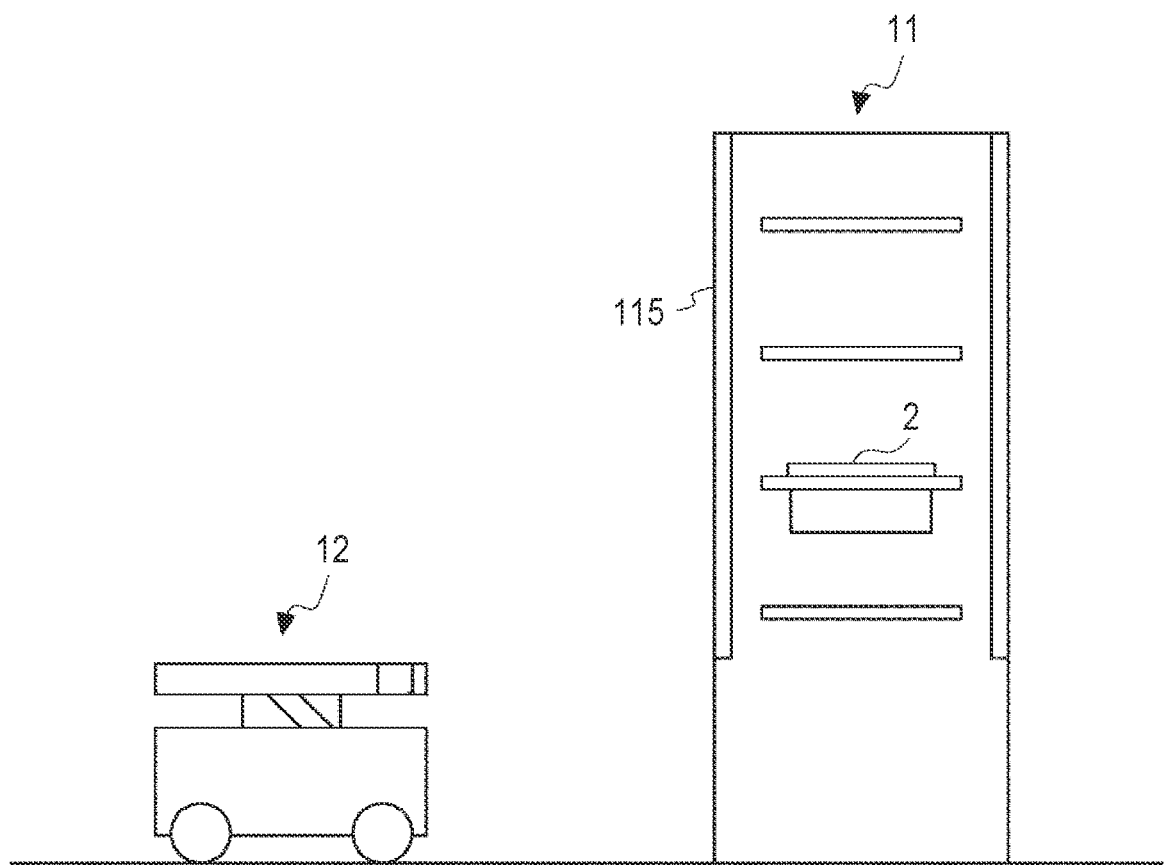
FIG. 7 is a side view showing the transport robot according to the embodiment before being coupled to the shelving unit.

Next, how the transport robot 12 picks up an item 2 from and stores an item 2 into the shelving unit 11 will be described with reference to FIGS. 7 to 15. FIG. 7 shows the state before the transport robot 12 picks up an item 2 from the shelving unit 11. The shelving unit 11 stores the item 2. The transport robot 12 advances toward the shelving unit 11. Although FIG. 7 shows an example in which the shelving unit 11 has the plate-shaped members 115 on its both front and back sides, the shelving unit 11 may have the plate-shaped member 115 only on its front side.

Figure 8:
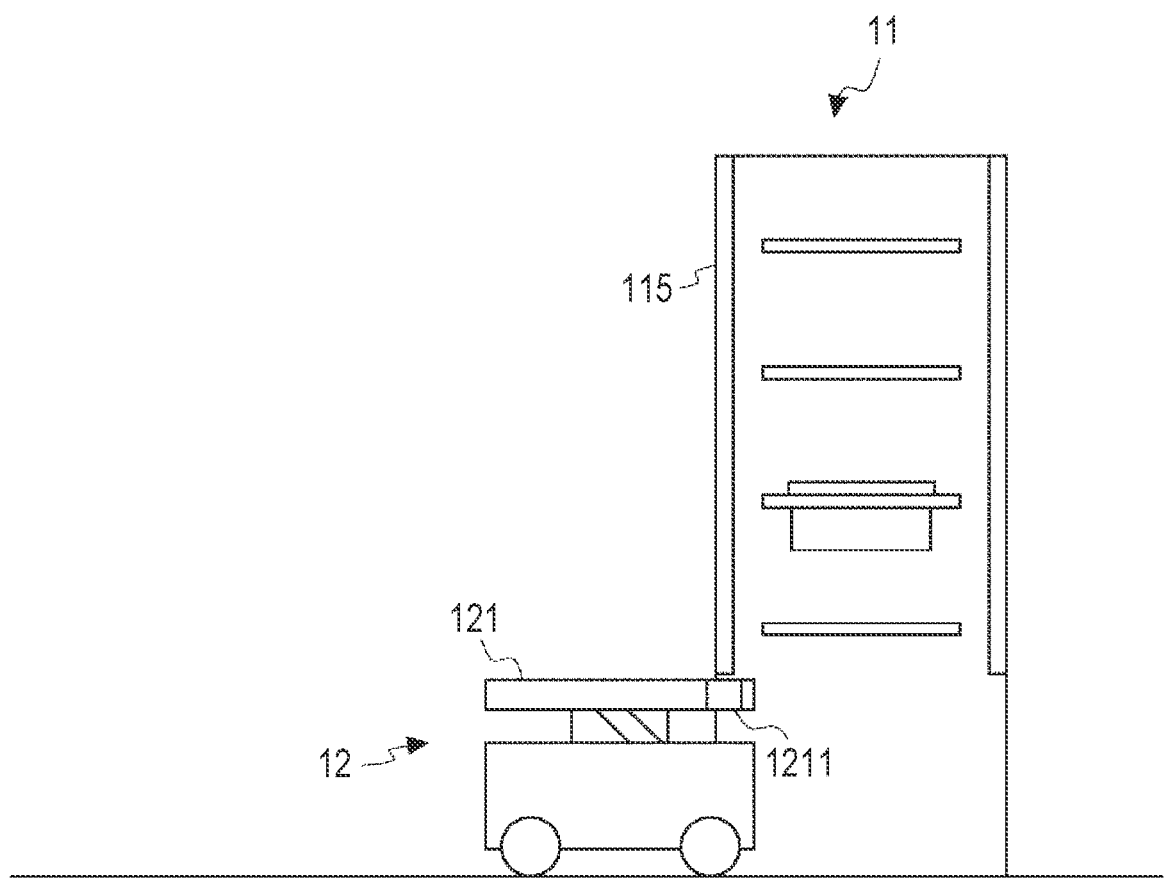
FIG. 8 is a side view showing the transport robot according to the embodiment having entered the lower part of the shelving unit.

The transport robot 12 then moves in the x direction. After the movement of the transport robot 12, the position in the x direction of the engaging portion 1211 substantially matches the position in the x direction of the plate-shaped member 115 as shown in FIG. 8. That is, the transport robot 12 is able to engage with the plate-shaped member 115 by lifting the placing table 121.

Figure 9:
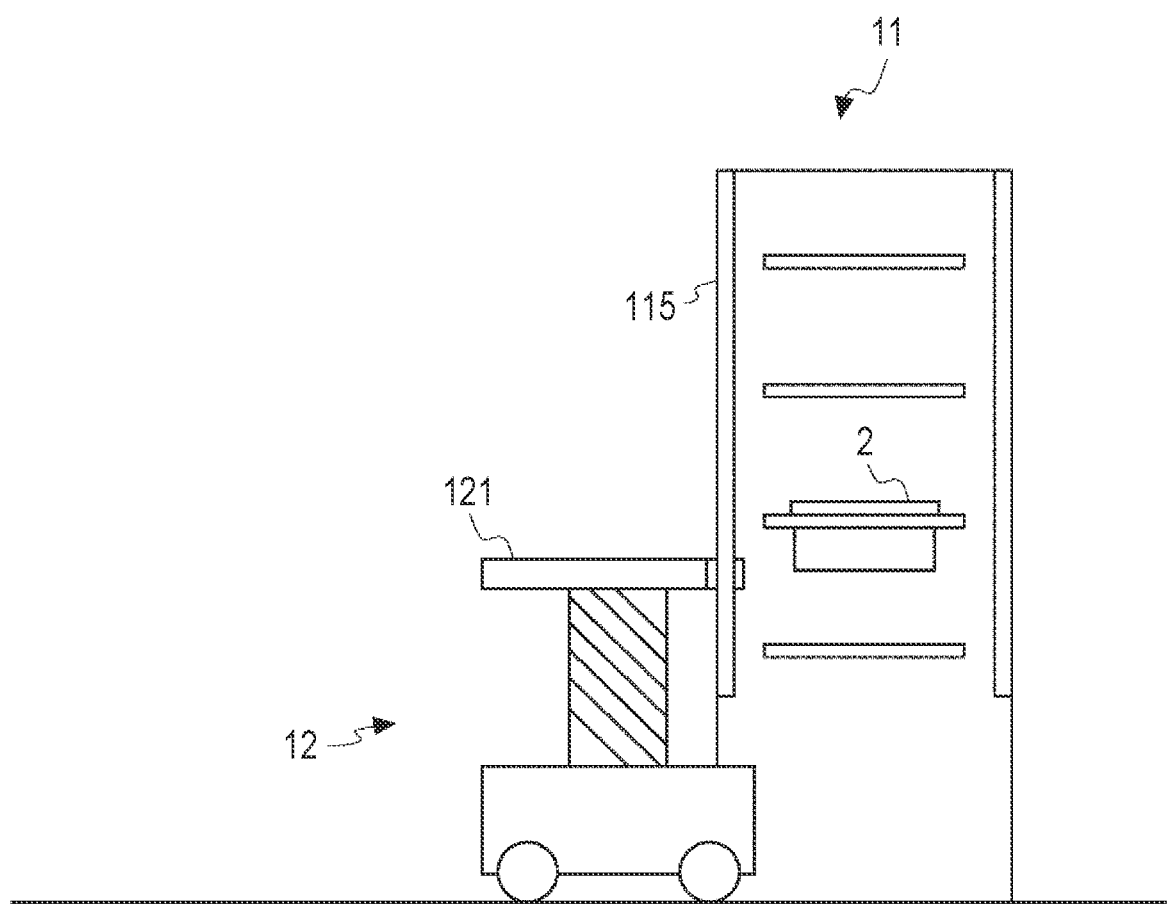
FIG. 9 is a side view showing the transport robot according to the embodiment having been coupled to the shelving unit.

Thereafter, the transport robot 12 lifts the placing table 121. When the height of the placing table 121 reaches the lower end of the plate-shaped member 115, the engaging portion 1211 starts engaging with the plate-shaped member 115. As described above, a sliding material or a roller may be provided in the engaging portion 1211. The sliding material and the roller may be provided at the bottom of the cutout (the recessed part of the placing table 121) or may be provided on the opening side of the cutout. Alternatively, the sliding member and the roller may be provided on the plate-shaped member 115. As shown in FIG. 9, the transport robot 12 lifts the placing table 121 to the height at which the transport robot 12 can pick up the item 2. The engaging portion 1211 and the plate-shaped member 115 are in an engaged state while the transport robot 12 is lifting the placing table 121.

Figure 10:
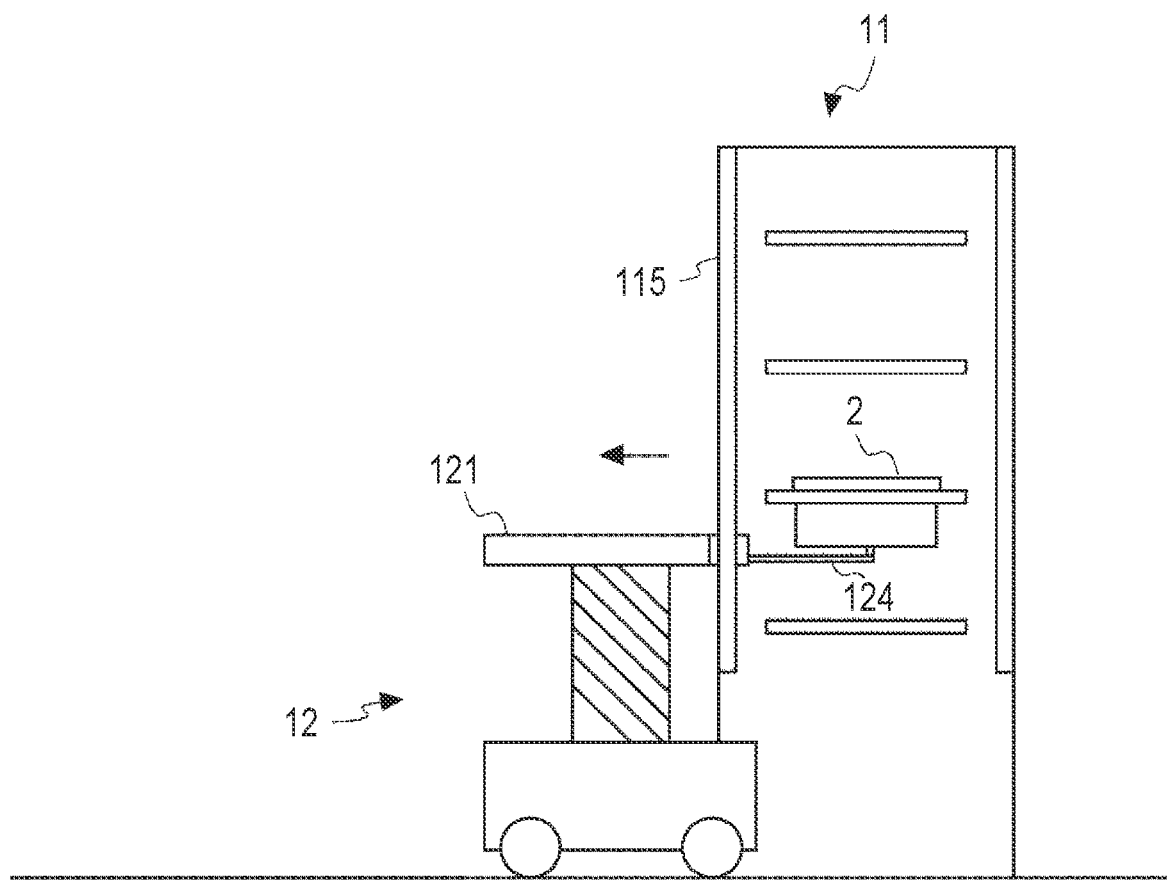
FIG. 10 is a side view illustrating an operation of picking up an item from the shelving unit by the transport robot according to the embodiment.

Subsequently, the transport robot 12 drives the arm 124 that picks up the item 2 as shown in FIG. 10. For example, the transport robot 12 may drive an L-shaped hook in the x direction to catch and pull the item 2 by the hook.

Figure 11:
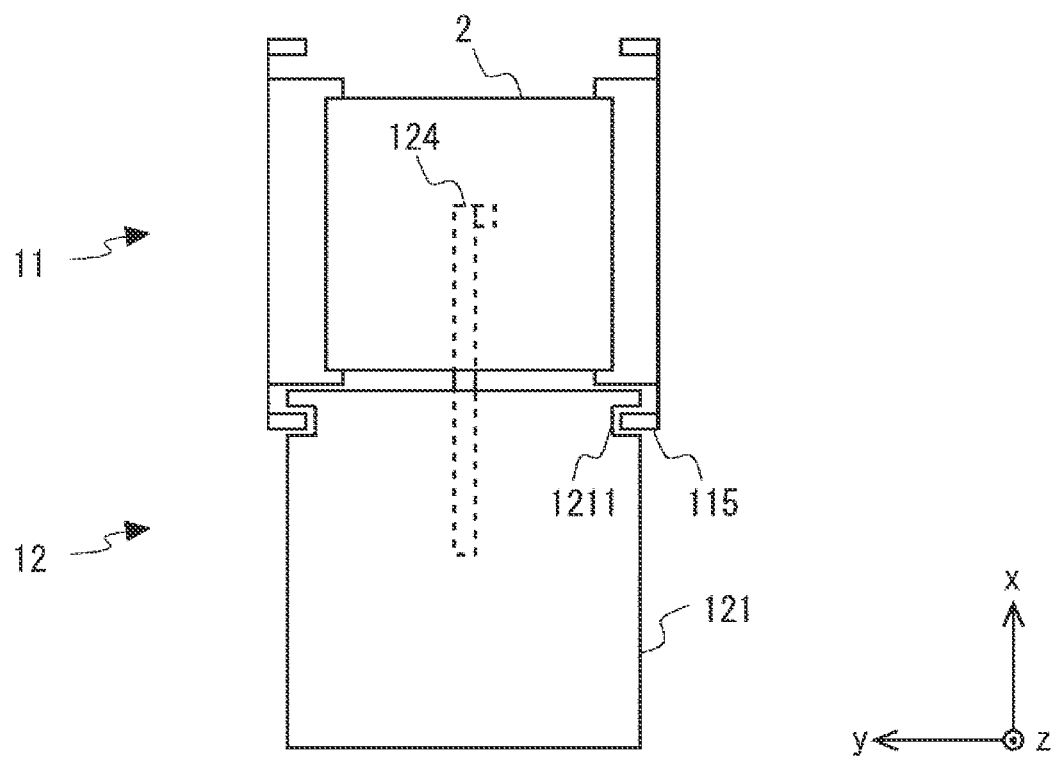
FIG. 11 is a plan view illustrating the operation of picking up an item from the shelving unit by the transport robot according to the embodiment.

FIG. 11 is a plan view showing the transport robot 12 with the arm 124 being advanced. The arm 124 is an L-shaped hook. At this time, the engaging portion 1211 of the placing table 121 and the plate-shaped member 115 are in an engaged state. The arm 124 protrudes beyond the placing table 121. By rotating the arm 124 around its axis, the transport robot 12 can catch the item 2 by the arm 124.

Figure 12:
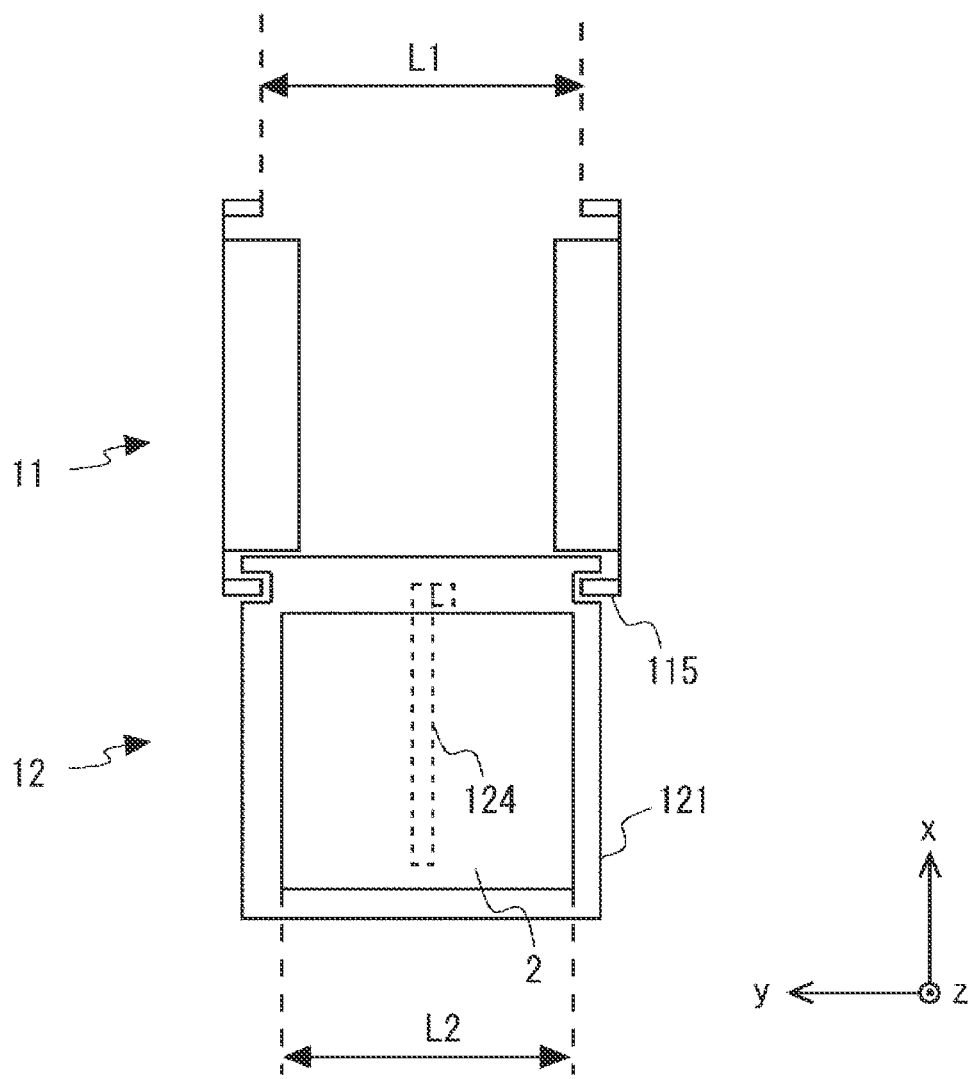
FIG. 12 is a plan view illustrating the operation of picking up an item from the shelving unit by the transport robot according to the embodiment.
Figure 13:
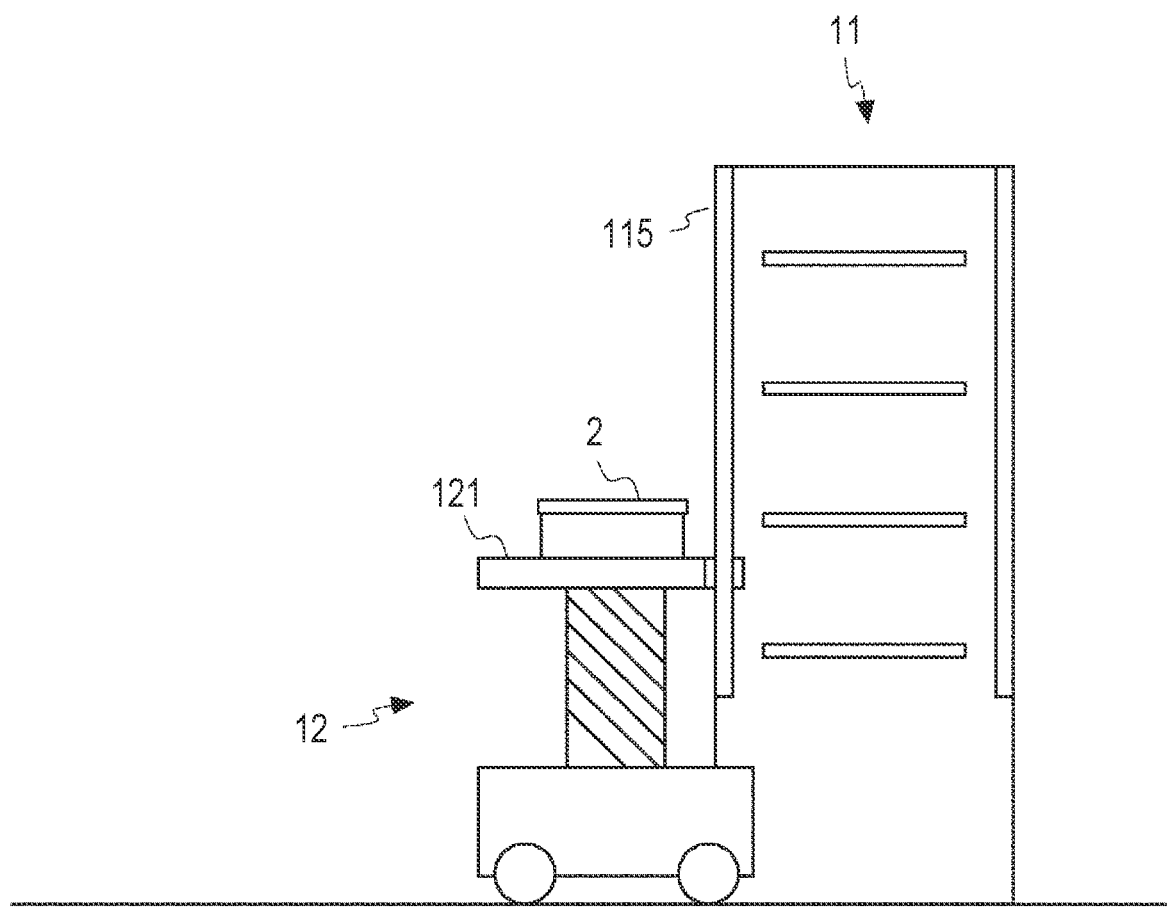
FIG. 13 is a side view showing the transport robot according to the embodiment having picked up an item from the shelving unit.

With the item 2 caught by the arm 124, the transport robot 12 retracts the arm 124 to place the item 2 on the placing table 121 as shown in FIG. 12. At this time, the arm 124 is housed in the placing table 121. As described above, since the width L1 of the clearance between the plate-shaped members 115 is greater than the width L2 of the item 2, the item 2 can be picked up using the arm 124. FIG. 13 is a side view showing the item 2 placed on the placing table 121.

Figure 14:
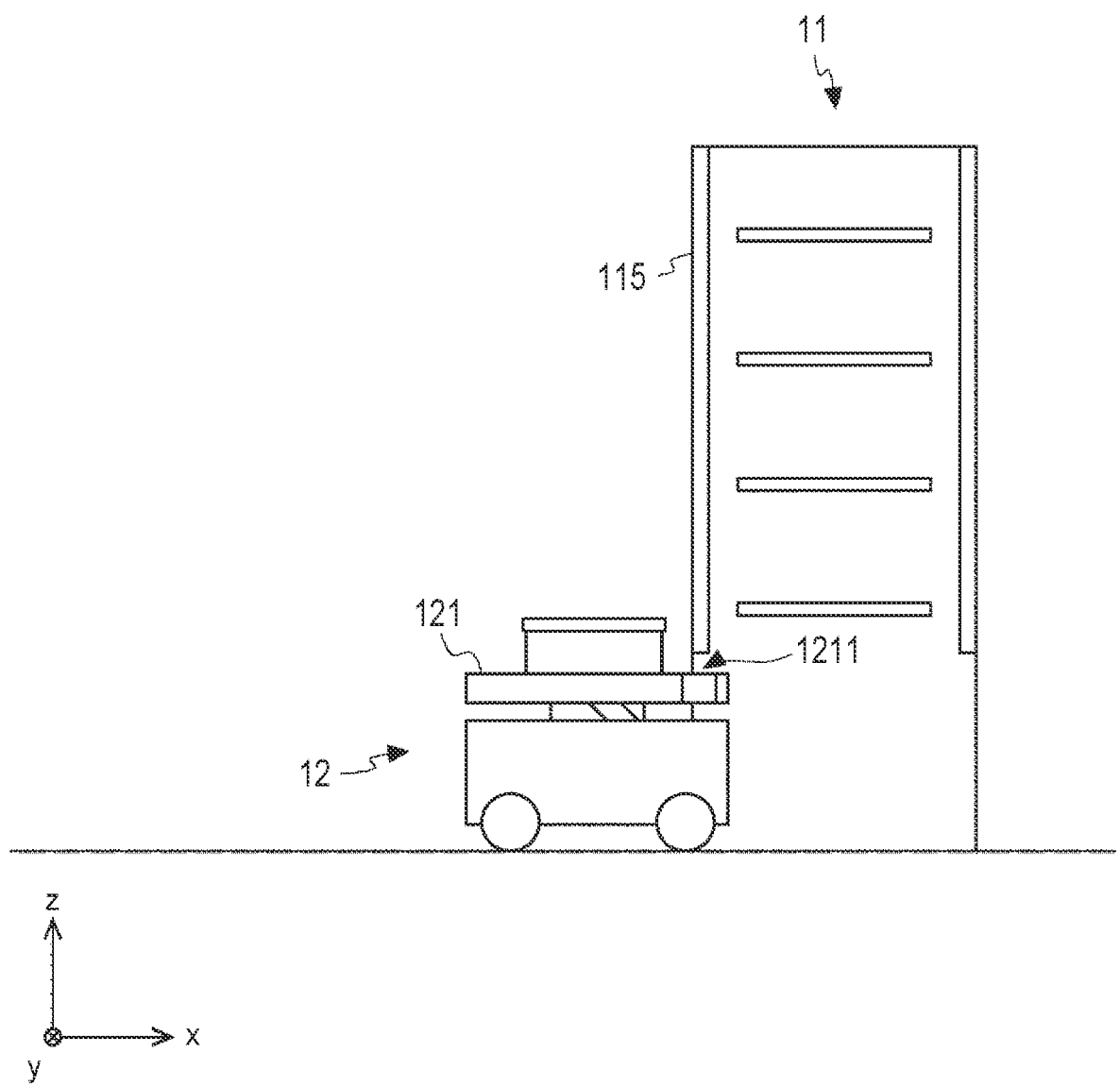
FIG. 14 is a side view showing the transport robot according to the embodiment having been disengaged from the shelving unit.
Figure 15:
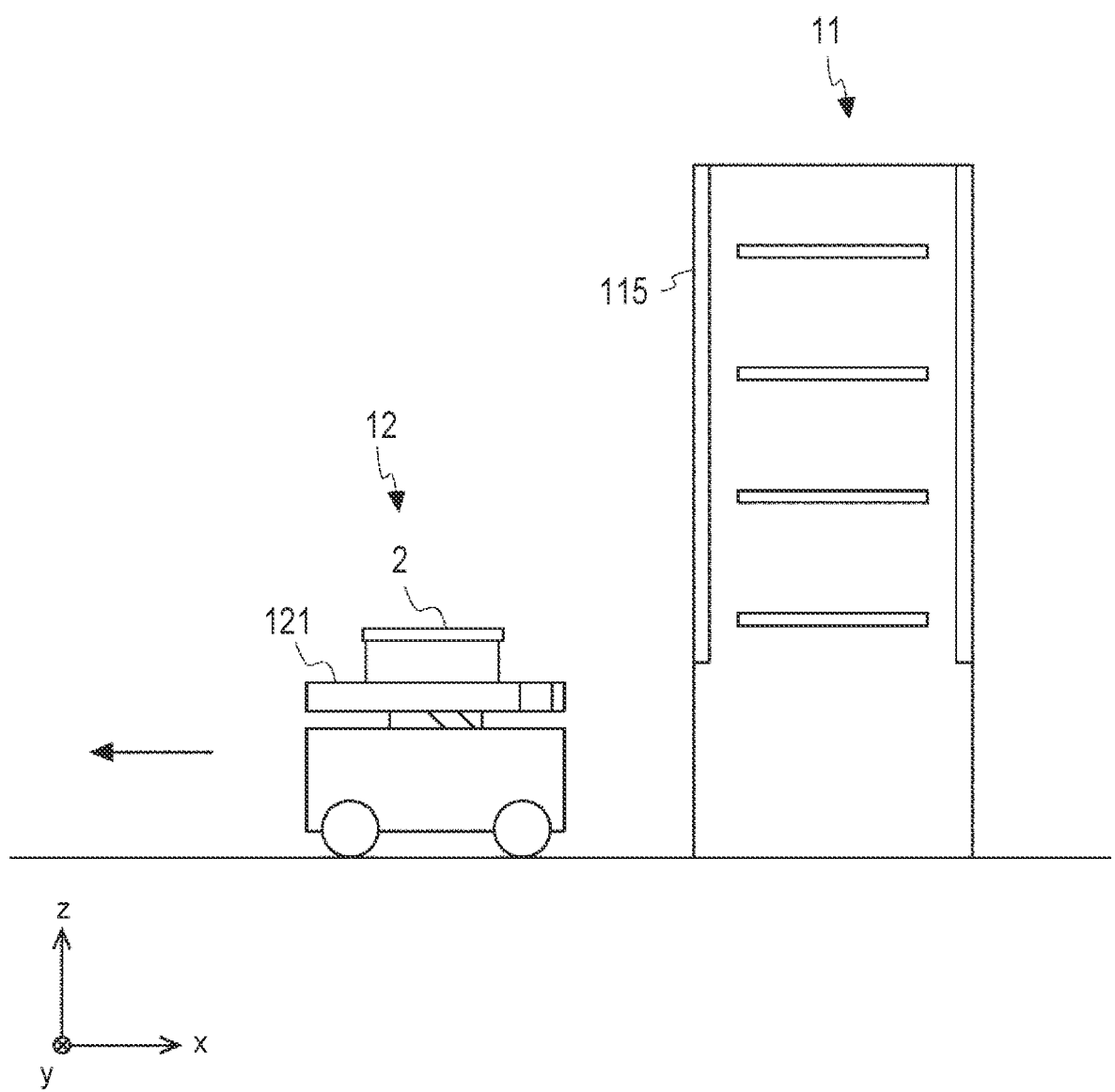
FIG. 15 is a side view showing the transport robot according to the embodiment transporting an item.

Thereafter, the transport robot 12 lowers the placing table 121. FIG. 14 shows the transport robot 12 having lowered the placing table 121. At this time, the engaging portion 1211 of the placing table 121 and the plate-shaped member 115 of the shelving unit 11 are in a disengaged state. As shown in FIG. 15, the transport robot 12 then travels with the item 2 placed on the placing table 121 and thus transports the item 2.

Similarly, the transport robot 12 can also store an item 2 into the shelving unit 11. In this case, with the item 2 placed on the placing table 121, the transport robot 12 engages the engaging portion 1211 with the plate-shaped member 115 of the shelving unit 11. The transport robot 12 then lifts the placing table 121 to the height at which the transport robot 12 can store the item 2 into the shelving unit 11. Thereafter, the transport robot 12 stores the item 2 into the shelving unit 11. For example, the transport robot 12 may store the item 2 into the shelving unit 11 by catching the item 2 on the placing table 121 by the arm 124 and advancing the arm 124. The transport robot 12 then lowers the placing table 121, disengages the placing table 121 from the shelving unit 11, and moves from the shelving unit 11. The transport robot 12 may engage the placing table 121 with the surrounding environment in situations other than when picking up the item 2 from or storing the item 2 into the shelving unit 11, such as when moving between floors. In this case as well, the possibility of the transport robot 12 falling when the placing table 121 is lifted can be reduced.

The transport robot according to the embodiment includes the placing table on which an item is placed and the plate-shaped member etc. of the shelving unit. With the placing table being engaged with the plate-shaped member etc. of the shelving unit, the transport robot places an item picked up from the shelving unit on the placing table or stores an item placed on the placing table into the shelving unit. Accordingly, the transport system according to the embodiment can reduce the possibility of the transport robot falling when picking up an item from the shelving unit or storing an item into the shelving unit.

If the lifting mechanism is bent by the reaction force when the transport robot pulls an item out of the shelving unit or pushing an item into the shelving unit, the distance between the shelving unit and the placing table may increase. The transport robot according to the embodiment can reduce the possibility of the transport robot becoming unable to perform the operation of pulling an item out of the shelving unit and the operation of pushing an item into the shelving unit.

First Modification

Figure 16:
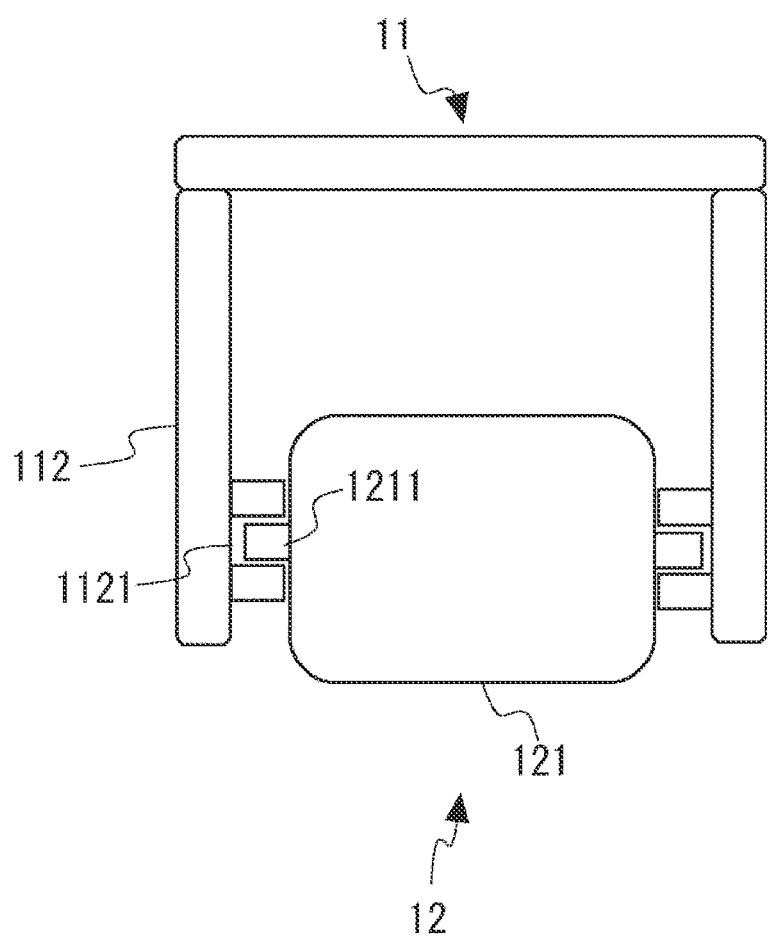
FIG. 16 is a schematic view showing the shelving unit and a placing table engaged with each other according to a first modification.

In a transport system according to a first modification, the engaging portion of the placing table 121 is not a cutout but a protrusion. FIG. 16 is a schematic view showing the placing table 121 of the transport robot 12 and the shelving unit 11 engaged with each other according to the first modification. The engaging portion 1211 is a protrusion protruding from the placing table 121. The side board 112 of the shelving unit 11 has a recess 1121 that engages with the engaging portion 1211 of the placing table 121. The transport system according to the first modification can also reduce the possibility of the transport robot falling when picking up an item from the shelving unit or storing an item into the shelving unit.

Second Modification

Figure 17:
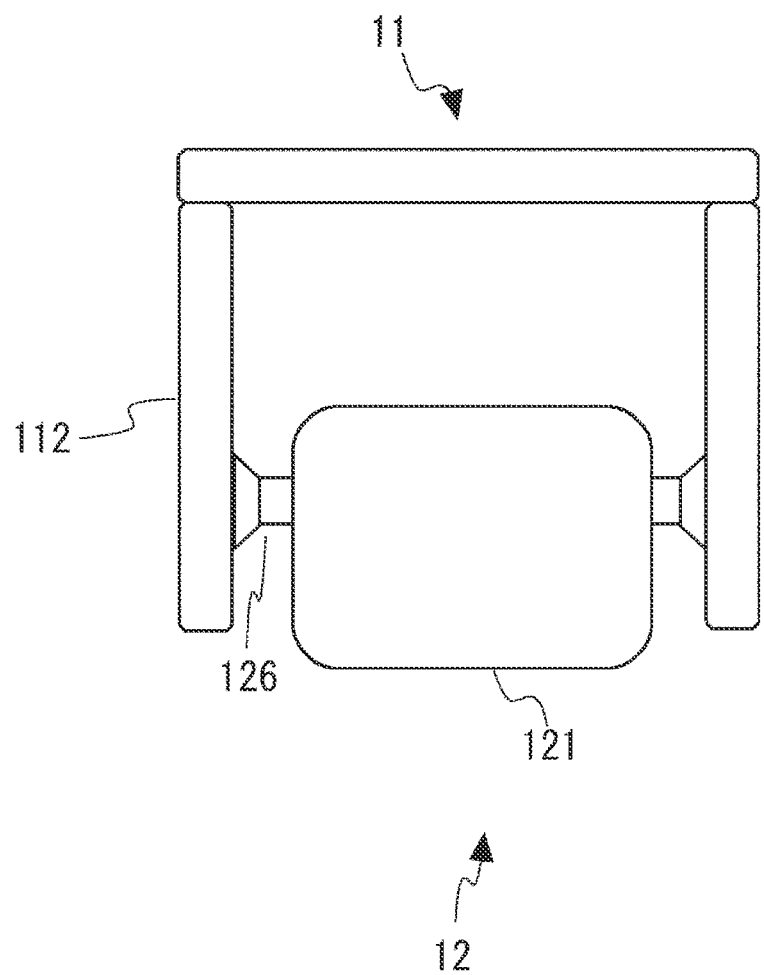
FIG. 17 is a schematic view showing the shelving unit and the placing table engaged with each other according to a second modification.

In a transport system according to a second modification, the transport robot engages the placing table with the shelving unit by advancing the arm from the placing table to the side boards. FIG. 17 is a schematic view showing the placing table 121 of the transport robot 12 and the shelving unit 11 engaged with each other according to the second modification. The transport robot 12 advances a pair of arms (referred to as the second arms 126) from the placing table 121 toward the side boards 112. The tip ends of the second arms 126 thus engage with the side boards 112. The second arms 126 are advanced from and retracted into the placing table 121. In this case, the transport robot 12 may advance the second arms 126 from the placing table 121 after lifting the placing table 121 and before picking up or storing an item. As in the first modification, the side board 112 of the shelving unit 11 may have the recess 1121 that engage with the second arm 126. That is, the second arm 126 may be the protrusion in the first modification and may be fitted in the recess 1121 of the shelving unit 11. The transport system according to the second modification can similarly reduce the possibility of the transport robot falling when picking up an item from the shelving unit or storing an item into the shelving unit.

Third Modification

Figure 18:
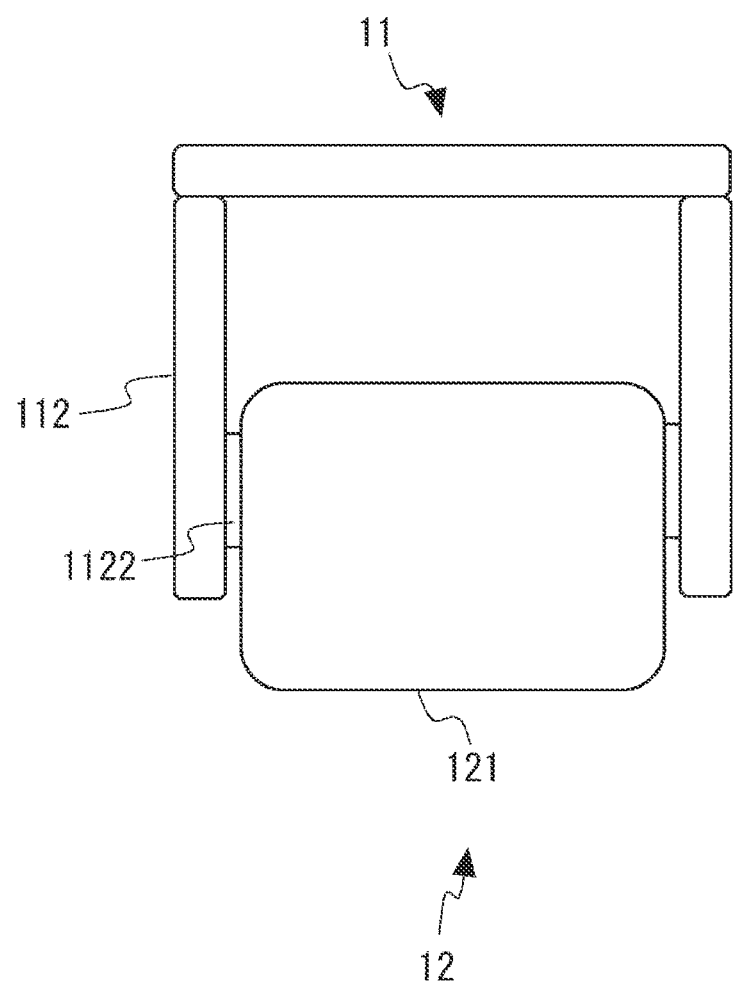
FIG. 18 is a schematic view showing the shelving unit and the placing table engaged with each other according to a third modification.

In a transport system according to a third modification, the side surfaces of the placing table 121 engage with the shelving unit 11 by an engaging member. FIG. 18 is a schematic view showing the placing table 121 and the shelving unit 11 engaged with each other according to the third modification. The shelving unit 11 has an engaging member 1122 formed on at least a part of the side board 112. For example, the engaging member 1122 is a friction member such as high friction cushion. The engaging member 1122 may be rolling resistance of a roller etc. The side surface of the placing table 121 engages with the engaging member 1122. In this case, the transport robot 12 may lift the placing table 121 while rubbing the placing table 121 against the engaging member 1122. The transport system according to the third modification can similarly reduce the possibility of the transport robot falling when picking up an item from the shelving unit or storing an item into the shelving unit.

Fourth Modification

Figure 19:
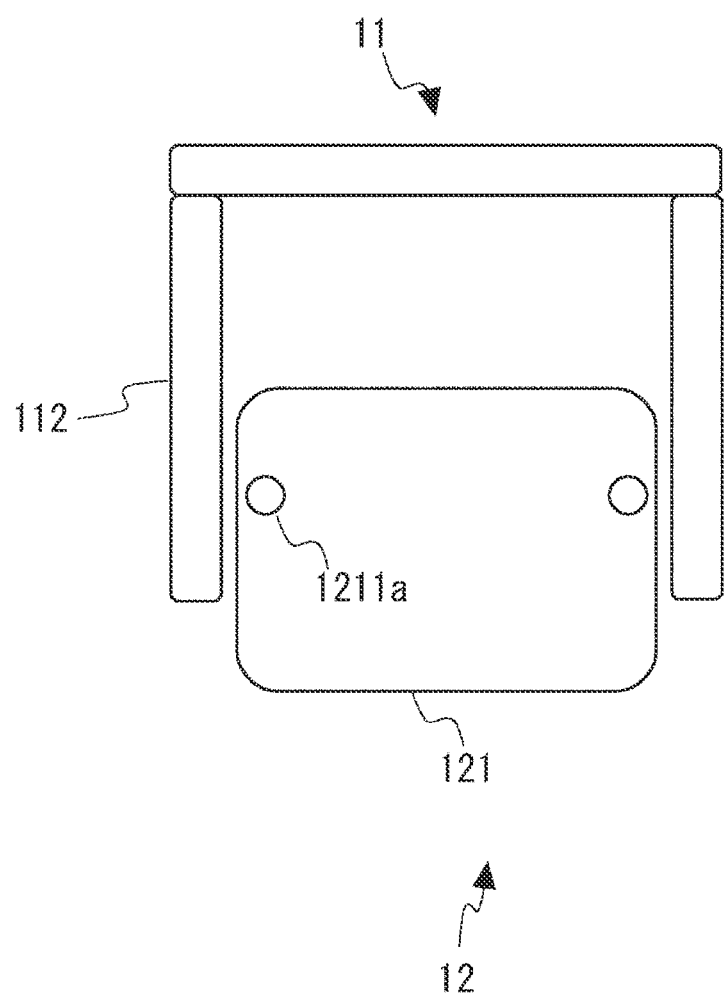
FIG. 19 is a schematic view showing the shelving unit and the placing table engaged with each other according to a fourth modification.

In a transport system according to a fourth modification, the side surfaces of the placing table magnetically engage with the shelving unit 11. FIG. 19 is a schematic view showing the placing table 121 and the shelving unit 11 engaged with each other according to the fourth modification. Magnets 1211a are embedded in both side surfaces of the placing table 121. The side boards 112 of the shelving unit 11 are made of metal. The placing table 121 thus magnetically engages with the shelving unit 11. Not the entire side board 112 need be made of metal, and a metal member may be disposed on a part of the side board 112. A magnet may be embedded in the side board 112. The transport robot 12 may switch the placing table 121 and the shelving unit 11 between an engaged state and a disengaged state by turning the magnetic force of the magnets 1211a on and off. In this case as well, the transport robot 12 may engage the placing table 121 with the shelving unit 11 when picking up the item 2 from or storing the item 2 into the shelving unit 11 after lifting the placing table 121. The transport system according to the fourth modification can also reduce the possibility of the transport robot falling when picking up an item from the shelving unit or storing an item into the shelving unit.

Fifth Modification

Figure 20:
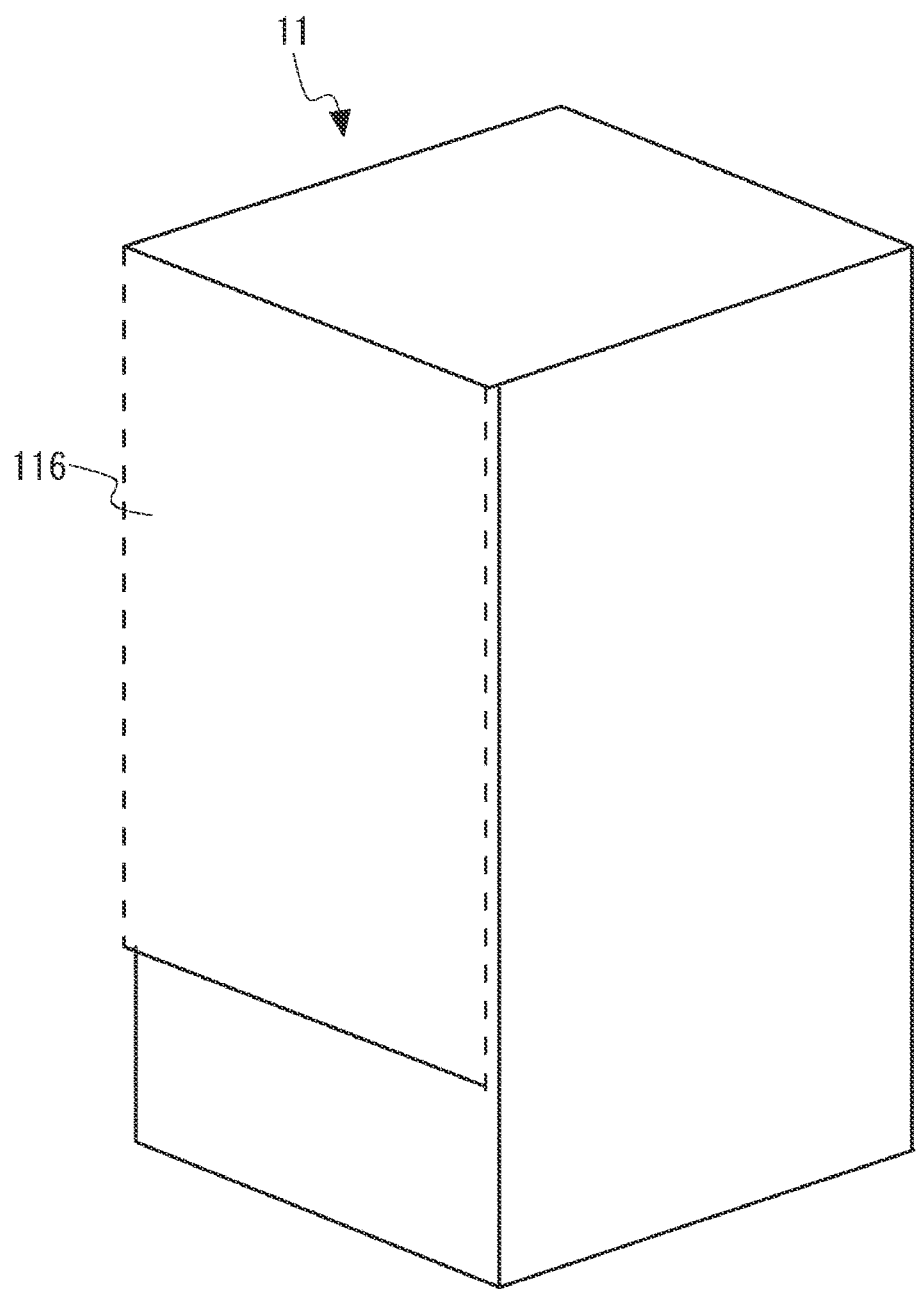
FIG. 20 is a schematic view of the shelving unit according to a fifth modification.

In a transport system according to a fifth modification, a cover member such as curtain provided on the shelving unit engages with the upper surface of the placing table, and the placing table and the shelving unit thus engage with each other. The cover member may be a shutter. FIG. 20 is a schematic view of the shelving unit 11 according to the fifth modification. A cover member 116 such as curtain is hung on the front side of the shelving unit 11 (side from which an item is picked up and stored). The side ends of the cover member 116 are engaged with the side boards of the shelving unit 11 by a zipper structure etc. There may be clearance under the cover member 116 through which the transport robot 12 can enter the shelving unit 11. In FIG. 20, the zipper structure is shown by dashed lines.

Figure 21:
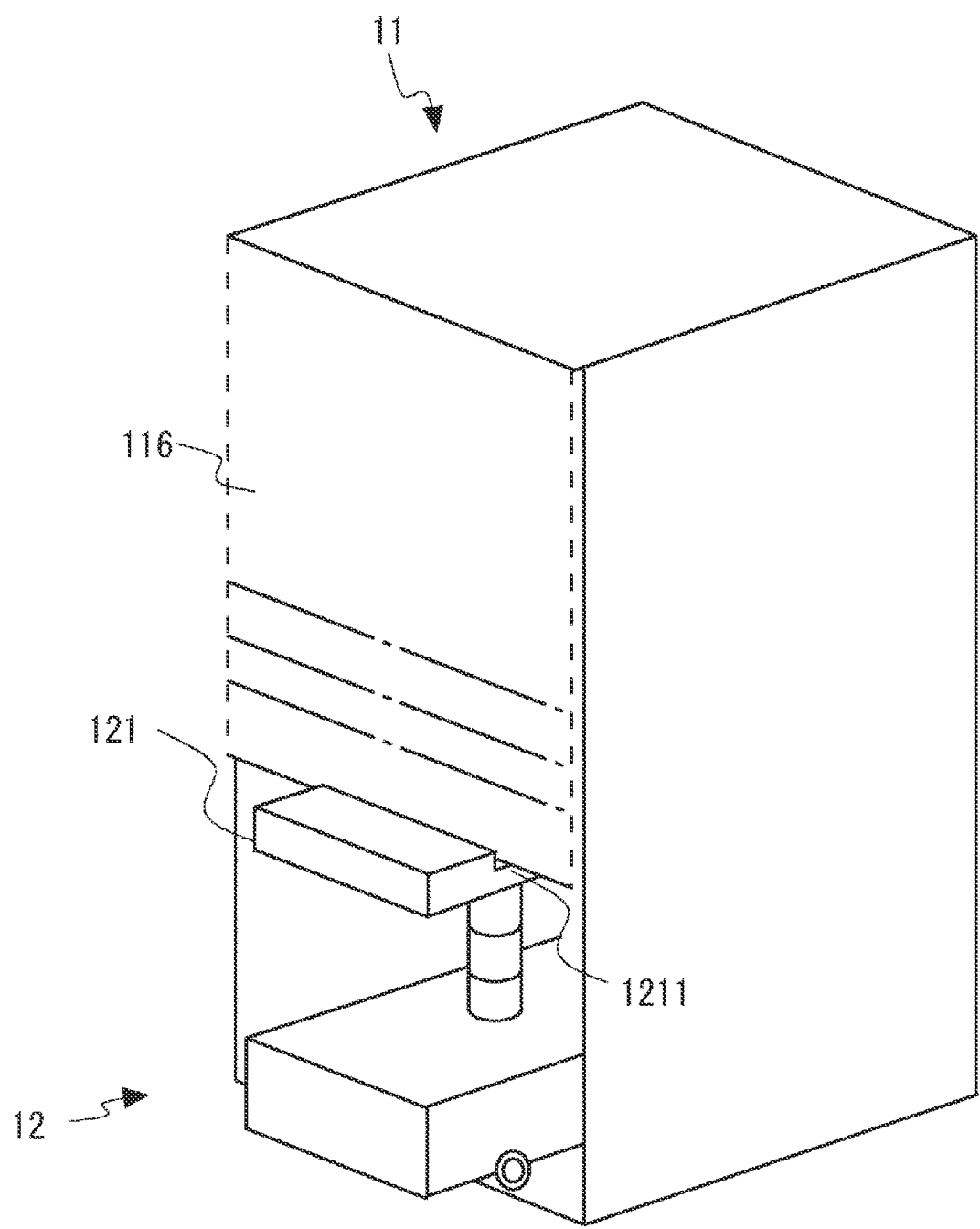
FIG. 21 is a schematic view showing the shelving unit and the placing table engaged with each other according to the fifth modification.

As shown in FIG. 21, the transport robot 12 engages the placing table 121 with the lower end of the cover member 116 and lifts the lower end of the cover member 116. Folds or lines that are formed when the cover member 116 is a curtain etc. are shown by long dashed short dashed lines. The placing table 121 has the engaging portion 1211 such as groove that engages with the cover member 116. As the lower end of the cover member 116 is moved upward, the side ends of the cover member 116 are disengaged from the side boards of the shelving unit 11 by the zipper structure accordingly.

In this case, as shown in FIG. 21, horizontal movement of the placing table 121 is restricted due to the zipper structure. The mechanism of engagement between the cover member 116 and the side boards of the shelving unit 11 is not limited to the zipper structure. For example, like a sunshade shutter, both sides of the cover member 116 may be engaged with the side boards of the shelving unit 11. The transport system according to the fifth modification can also reduce the possibility of the transport robot falling when picking up an item from the shelving unit or storing an item into the shelving unit.

The present disclosure is not limited to the above embodiment and can be modified as appropriate without departing from the spirit and scope of the disclosure.

What is claimed is:

1. A transport system comprising a transport robot configured to transport an item picked up from a shelving unit or to be stored into the shelving unit, wherein:
   the transport robot includes:
      a placing table on which the item is to be placed,
      a sensor, and
      a lifting mechanism configured to lift and lower the placing table;
   the placing table includes an engaging portion configured to engage with the shelving unit;
   the shelving unit includes:
      a first protrusion protruding inward from a side board of the shelving unit, or
      a first recess formed in the side board of the shelving unit;
   the placing table includes:
      a second recess that engages with the first protrusion protruding inward from the side board of the shelving unit, or
      a second protrusion that engages with the first recess formed in the side board of the shelving unit;
   the shelving unit includes a plate-shaped member extending in a vertical direction, the plate-shaped member being the first protrusion;
   the placing table includes a cutout that engages with the plate-shaped member, the cutout being the second recess;
   the plate-shaped member has a plurality of holes arranged at different heights; and
   the sensor is configured to detect each of the holes in the plate-shaped member is located inward of the cutout.

2. The transport system according to claim 1, wherein the engaging portion is configured to restrict horizontal movement of the placing table.

3. The transport system according to claim 1, wherein the transport robot is further configured to
   pick up the item from the shelving unit and place the item on the placing table, and
   store the item placed on the placing table into the shelving unit.

4. The transport system according to claim 1, wherein:
   a sliding material or a roller is provided in the cutout of the placing table; and
   the placing table is configured to slide while being engaged with the plate-shaped member.

* * * * *